United States Patent [19]
Kirkwood

[11] Patent Number: 4,982,184
[45] Date of Patent: Jan. 1, 1991

[54] ELECTROCRYSTALLOCHROMIC DISPLAY AND ELEMENT

[75] Inventor: John M. Kirkwood, Pennsauken, N.J.

[73] Assignee: General Electric Company, Moorestown, N.J.

[21] Appl. No.: 293,039

[22] Filed: Jan. 3, 1989

[51] Int. Cl.[5] ............................................. G02F 1/29
[52] U.S. Cl. .................................. 340/783; 340/757; 340/764; 340/701; 350/163; 350/360; 350/486
[58] Field of Search ............... 340/763, 764, 757, 783, 340/701; 350/163, 360, 486

[56] References Cited

U.S. PATENT DOCUMENTS

| | | | |
|---|---|---|---|
| Re. 29,094 | 12/1976 | Price | 350/260 |
| 3,233,040 | 2/1966 | Crane | 358/233 |
| 4,001,635 | 1/1977 | d'Auria et al. | 340/764 |
| 4,092,637 | 5/1978 | Barclay et al. | 340/763 |
| 4,182,553 | 1/1980 | Sheridon . | |
| 4,186,394 | 1/1980 | Bobak et al. . | |
| 4,299,450 | 11/1981 | Funada et al. | 350/360 |
| 4,336,536 | 6/1982 | Kalt et al. . | |

Primary Examiner—Alvin E. Oberley
Assistant Examiner—Dov Popovici
Attorney, Agent, or Firm—William H. Meise

[57] ABSTRACT

A display changes the color of reflected light in response to the value of electrical potential applied to individual pixels of the display. Each pixel includes an array of light reflectors mounted on a corresponding array of electrostrictive elements. In the absence of energization, all the light reflector lie on a common plane and reflect light of all colors. The electrostrictive elements of each pixel in one embodiment are connected to be driven in common by a single potential. Each electrostrictive element of the array of each pixel has an effective length which differs from that of the adjoining elements so that the common voltage results in a differential expansion or contraction. The differential movement results in a separation between adjacent reflectors. When the separation is λ/4 at the wavelength of a color of light, destructive interference cancels that color, whereby physiological effects change the apparent color of the reflected light. In a second embodiment, the voltages applied to adjacent electrostructive elements differ.

8 Claims, 5 Drawing Sheets

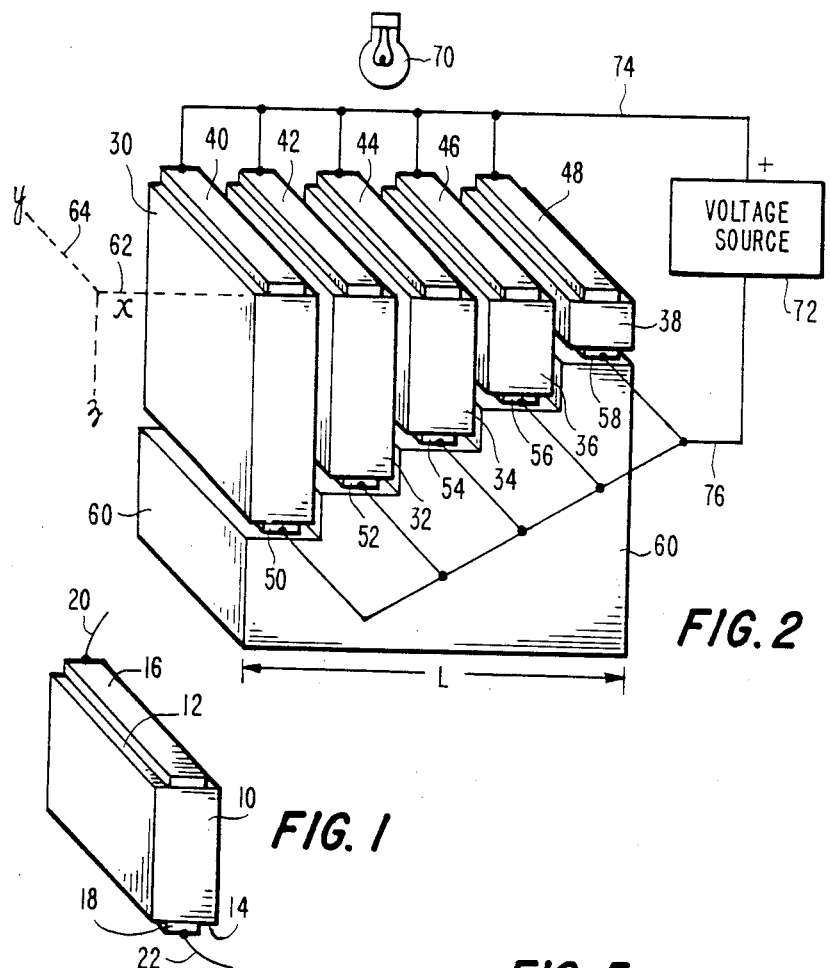
FIG. 2
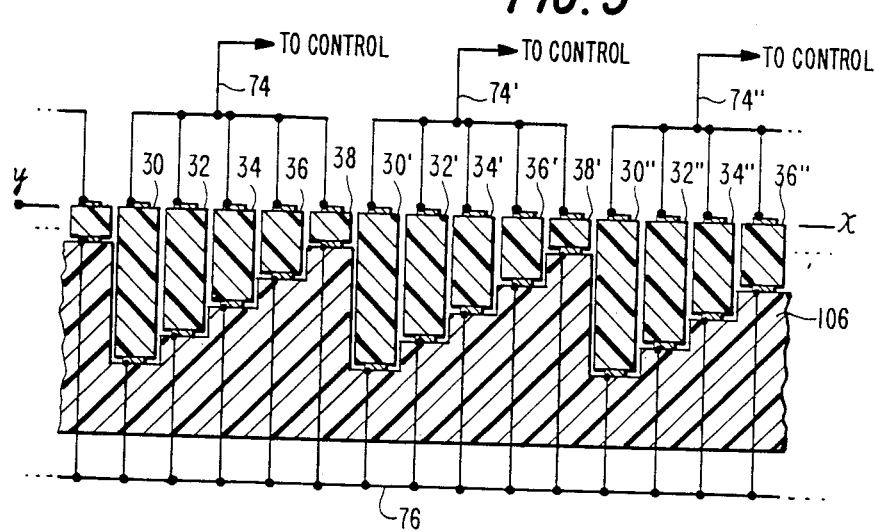
FIG. 1
FIG. 5

ELECTROCRYSTALLOCHROMIC DISPLAY AND ELEMENT

BACKGROUND OF THE INVENTION

This invention relates to elements which reflect different colors in response to applied voltage, and to displays formed from arrays of such elements.

Information displays have taken on a great deal of importance for conveying information. For example, television receivers include a kinescope, which is adapted for producing an internally illuminated color display of images. The television monitor for displaying text and graphics for interaction with computers has become ubiquitous. Such internally lit displays tend to consume substantial power. Consequently, for some applications reflective displays have become common. For example, battery-operated portable instruments, including digital watches, use liquid crystal displays which operate by reflecting light. For some purposes, liquid crystal displays may not provide sufficient reflection. Also, the production of color displays by use of liquid crystals does not, at the current state of the art, produce intense colors.

SUMMARY OF THE INVENTION

A device for controlling the color of light reflected in response to illumination by a polychromatic source of light includes a reference reflective surface facing the source of light. The reflective surface has first and second dimensions transverse to a line joining the source of light and the reference reflective surface. At least the first dimension is on the order of a wavelength of visible light. The device also includes an electrostrictive element including a second reflective surface having first and second dimensions. The first dimension of the second reflective surface is also on the order of a wavelength of visible light. The second reflective surface is located contiguous with the reference reflective surface. The electrostrictive element includes first and second electrodes which are adapted for receiving an electrical potential. The location and spacing of the first and second electrodes on the electrostrictive element are selected in conjunction with the available electrical potential for causing the reflective surface to move in response to the potential in a direction having at least a component lying along the line which joins the source of light with the second reflective surface. The application of potential to the electrodes of the electrostrictive element causes motion of the second reflective surface relative to the reference reflective surface which results in a separation of the two reflective surfaces by approximately one-quarter wavelength at a frequency within the visible range. The quarter-wavelength separation causes destructive interference of a component of the polychromatic light, which results in reflection of a selected color of light. In a particular embodiment of the invention, the reference reflective surface is also mounted upon an electrostrictive element.

DESCRIPTION OF THE DRAWING

FIG. 1 is a perspective or isometric view of an electrostrictive element which is a constituent of a color-changing apparatus according to the invention;

FIG. 2 is a perspective or isometric view of an array of electrostrictive elements similar to that of FIG. 1 which is adapted for control of reflected light in response to a potential;

FIG. 5 is an elevation view of a portion of a display including an array of elements each of which is similar to that of FIG. 2;

FIG. 6a illustrates, in simplified form, a display apparatus utilizing a plurality of arrangements such as the one of FIG. 2, and FIG. 6b illustrates in simplified schematic form details of portions of FIG. 6a;

DESCRIPTION OF THE INVENTION

Figure 3:
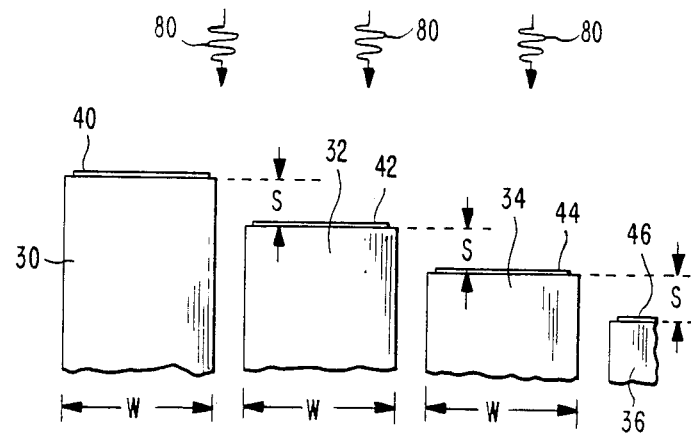
FIG. 3 illustrates in elevation view portions of certain electrostrictive elements and reflective surfaces of FIG. 2 as an aid to understanding the operation of the apparatus.

FIG. 1 is a representation of a single electrostrictive element in the form of a dielectric electrostrictive block 10 of approximately rectangular shape having an upper surface 12 and a lower surface 14 which is not visible in FIG. 1. In this context, the term electrostrictive relates to objects which change size or morphology in response to applied electric potential. Upper surface 12 of electrostrictive block 10 has deposited thereon, as by vapor deposition, an electrode including a thin layer 16 of a conductive material such as silver. Similarly, lower surface 14 has deposited thereon a corresponding metallic layer 18. Layers 16 and 18 act as electrodes to which wires such as 20 and 22 may be connected for application of voltage to electrostrictive element 10. Application of a direct voltage to electrostrictive element 10 causes, as known, a change in the shape or morphology of block 10. In particular, application of voltage can increase or decrease the distance between the upper surface 12 and lower surface 14 of block 10, and correspondingly between metallized layers 16 and 18 deposited thereon.

FIG. 2 illustrates in perspective or isometric view an array of electrostrictive elements 30, 32, 34, 36 and 38, each having a separation between end metallizations such as 40, 50 which differs from that of the adjacent element, as for example, 42, 52. Electrostrictive elements 30 through 38 are mounted on a stepped support, illustrated as 60, which is made from a dielectric material. The dimensions of the steps of support 60 are selected in conjunction with the dimensions between top and bottom faces of electrostrictive elements 30 through 38 so that the upper end faces of the electrostrictive blocks lie essentially in a plane defined by an x axis 62 and a y axis 64. It should be noted that the thickness of metallization layers such as 16 and 18 of FIG. 1 and corresponding metallizations 40–48 (the hyphen represents the word "through", indicating all the described elements lying within the numbered sequence) and 50–58 of FIG. 2 are illustrated as being proportionately thicker than the actual metallization would be. Thus, the upper and lower faces of electrostrictive elements 30 through 38 and the upper and lower surfaces of the associated metallizations lie essentially in the x-y plane illustrated in FIG. 2 when the electrostrictive elements are deenergized.

It should be noted that while only five electrostrictive elements have been illustrated in FIG. 2, many more may be used. A preferred embodiment includes about 250 electrostrictive elements in a length L of about 1/300 inch (84μ). The dimensions of the elements are further described below.

In FIG. 2, a light source illustrated as a light bulb 70 is mounted above the upper faces of electrostrictive elements 30 through 38. In practice, the actual distance of light source 70 from the upper faces of elements 30 through 38 is great enough so that the distance from source 70 to all of the elements is essentially the same, i.e., light source 70 may be considered to be a sufficiently great distance from elements 30 through 38 so that a wavefront of light is essentially planar across any two adjacent electrostrictive elements. At least the upper faces of electrostrictive elements 30 through 38 are inherently light-reflective or are made to be light-reflective. The inherent reflectivity may arise due to a relatively high coefficient of refraction of the electrostrictive material, or due to the reflectivity of the metallizations 40 through 48, or a combination of both. With elements 30 through 38 deenergized and the upper faces lying essentially in the x-y plane, light arriving from light source 70 is reflected. If the light is polychromatic, all the several wavelengths contained therein are reflected substantially unaffected, and if source 70 produces white light, white light will be reflected.

Also illustrated in FIG. 2 is a voltage source 72 for producing a direct voltage on a first bus 74 relative to a second bus 76. Bus 74 is connected to upper metallizations 40, 42, 44, 46 and 48 of electrostrictive elements 30, 32, 34, 36 and 38, respectively. Similarly, bus 76 is connected to lower metallizations 50, 52, 54, 56 and 58 of electrostrictive elements 30, 32, 34, 36 and 38, respectively. When voltage source 72 is so connected, electrostrictive elements 30 through 38 each expand or contract, depending upon the polarity of applied voltage, by an amount which is proportional to the length of the electrostrictive element as measured between the electrodes its upper and lower faces. Thus, application of the same voltage to all of the electrostrictive elements in the array of FIG. 2 results in expansion or contraction of all the electrostrictive elements in a direction which depends upon the polarity of the voltage, the location of the electrodes and upon the orientation of the axes of the structure if the material is crystalline. The expansion or contraction will be differential because of the differing lengths of the various electrostrictive elements.

Assuming that the polarity of the applied voltage is such as to cause expansion of the associated electrostrictive element in a vertical direction, corresponding to a direction in line with a line extending from light source 70 to the upper surface of the array of elements illustrated in FIG. 2, the upper surface will be distorted in a manner illustrated in more detail in FIG. 3. In FIG. 3, elements corresponding to those of FIG. 2 are designated by the same reference numeral. In FIG. 3, the width of each of electrostrictive element 30, 32, 34 . . . is illustrated as W. In order to be reflective, dimension W must be a significant fraction of a wavelength of visible light, and is preferably approximately equal to one wavelength in the center of the visible light spectrum, or about 0.5μ (microns), corresponding to 0.5E-06 meters. Also as illustrated in FIG. 3, light represented by photon symbols 80 impinges upon the structure from the top. As mentioned, the energization of electrostrictive elements 40, 42, . . . results in a differential motion which causes the planes of the reflective upper surfaces to be displaced. The displacement is proportional to the separation between the energizing electrodes. The separation between the upper reflective faces of electrostrictive elements 30 and 32 is illustrated a S. The separation between the upper reflective faces of electrostrictive elements 32 and 34 is also illustrated as S. The dimensions of the electrostrictive elements between their respective electrode pairs is selected in conjunction with the range of energization voltages so that the value of S lies in a range extending from 0.19 to 0.38 microns, corresponding to one-quarter wavelength (λ/4) within the visible light region. When the magnitude of S lies within this range, illumination by photons 80, representing white light, results in reflection of photons which are mutually out-of-phase at the wavelength corresponding to the color for which S is one-quarter wavelength.

This out-of-phase condition results from the additional path length through which light must travel to be reflected from one surface by comparison with the path length required for reflection from the next adjacent surface. For example, taking the light 80 reflected from the upper surface of electrostrictive element 30 as a reference, light reflecting from the upper surface of adjacent element 32 travels an additional path length of λ/4 to reach element 32, and a further λ/4 to return to the same level as the upper surface of element 30, for a total path length difference of λ/2, or 180° of phase. The mutually out-phase condition of the light reflected from adjacent reflective surfaces results in destructive interference or cancellation of light of that color.

The destructive interference of light of a particular color caused by application of voltage to the structure of FIG. 2 causes a physiological effect which is perceived as a change in color. This phenomenon is well known and is used, for example, in the mixing of paints, which is a color subtractive process.

Figure 4:
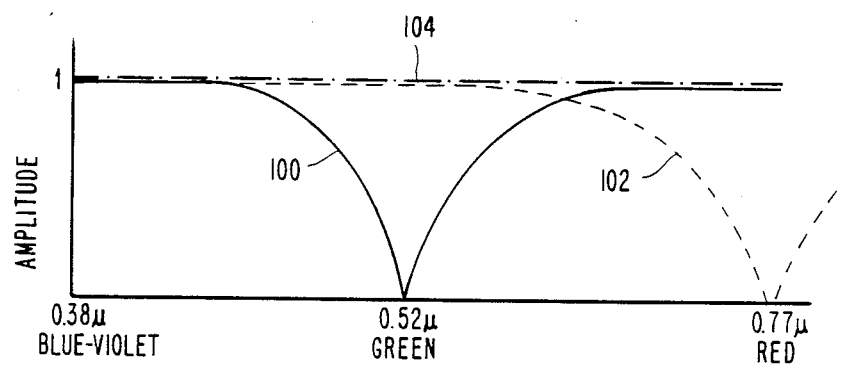
FIG. 4 is an amplitude-wavelength or spectrum plot illustrating the result of the operation illustrated in FIG. 3.

FIG. 4 illustrates a plot of a visible light spectrum with wavelengths extending from 0.38μ to 0.77μ. White light would have equal energy at all wavelengths, illustrated by dot-dash line 104 having a normalized value of 1 measured along the ordinate. In FIG. 4, solid-line plot 100 has unity value at 0.38 microns and at 0.77 microns, and dips to a null representing substantial cancellation of reflected light at a wavelength near 0.58 microns, which corresponds to the color green. Plot 100 represents the result of attenuation of white light incident upon a structure such as that of FIG. 2 when the magnitude S illustrated in FIG. 3 is about 0.13 microns, which is λ/4 within the green light range. Plot 100, therefore, represents white light from which a substantial green component has been eliminated, which provides a physiological sensation of a violet color.

Dashed-line plot 102 of FIG. 4 represents the structure of FIG. 2 at a greater magnitude of applied voltage, such that the separation S of FIG. 3 is approximately 0.19 microns. A value of S of 0.19 microns corresponds to λ/4 at 0.77 micron wavelength, at which light has a red color. Consequently, the reflected light will have the red component destructively cancelled. The absence of a red component causes a physiological sensation of a green or aqua color. Similarly, at a lesser voltage such that cancellation or destructive interference of the light occurs at 0.38 microns, blues or violets would be cancelled from the reflected light, which would provide a yellow physiological sensation.

FIG. 5 is a simplified cross-sectional elevation view of display made up of a plurality of arrays such as the array of FIG. 2. As illustrated in FIG. 5, a support element 106 formed from a dielectric material provides a repeating sequence of five steps. As mentioned, a preferred embodiment provides about 250 steps in each recurrence of the sequence. Each recurrence of the sequence corresponds to one pixel (picture element) of the display. The height of the steps is selected in conjunction with the height of the associated electrostrictive element so that in the nonenergized state the reflective upper end facets or faces of all the electrostrictive elements lie in the xy plane. As in the arrangement of FIG. 2, all the elements of one array of steps are connected electrically in parallel. Thus, elements 30, 32, 34, 36 and 38 of FIG. 5 have their upper electrodes (not separately designated) connected in common to a bus 74, and their lower metallizations connected in common to a bus 76. The adjacent set of elements including elements 30', 32', 34', 36', and 38' have their upper electrodes in common to a bus 74' which is not connected to bus 74. However, elements 30'-38' have their lower electrodes or metallizations connected to common bus 76. Similarly, electrostrictive elements 30", 32", 34", 36" . . . have their upper electrodes connected in common to a bus 74"which is not connected to either bus 74 or to bus 74'. The lower electrodes of electrostrictive elements 30"-36" . . . are connected to common bus 76. With the described arrangement, a different voltage may be applied to electrostrictive elements 30-38 by comparison with the voltage applied to elements 30'-38' or to 30"-36", so that different colors may be reflected by different pixels or portions of the display.

Figures 6A, 6B:
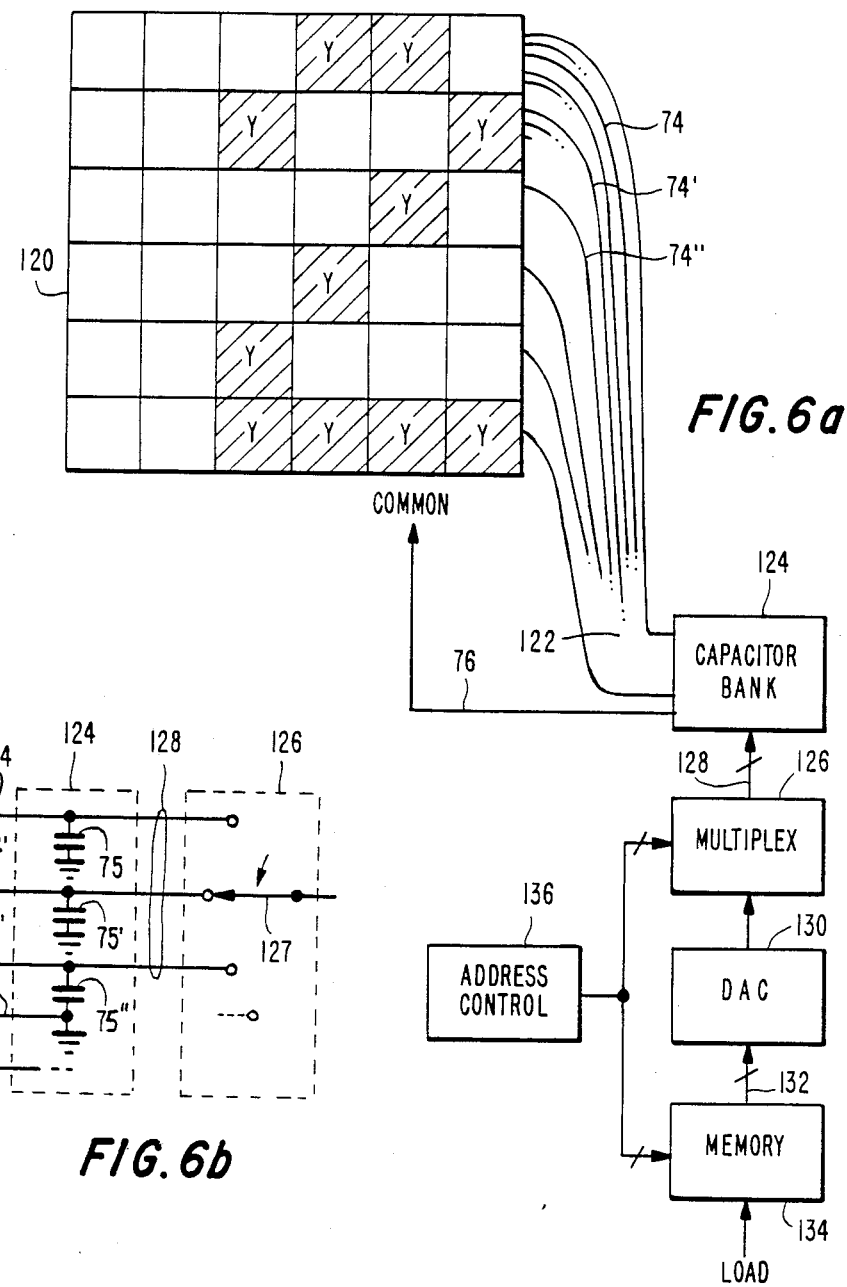

FIG. 6a illustrates in simplified form a two-dimensional display 120 consisting of rows and columns, each element of which is an arrangement similar to that of FIG. 2, and each row of which is an array similar to that illustrated in FIG. 5. As described in conjunction with FIG. 5, each pixel of the display 120 of FIG. 6a is associated with its own individual bus such as 74, 74', 74" etc. As illustrated in FIG. 6a, display 120 includes six rows and six columns, and therefore, includes 36 elements similar to the arrangement of FIG. 2. Consequently, there are 36 independent buses which are illustrated as collected into a bundle 122. In addition to bundle 122, one or more common conductors 76 complete the connections. Each bus 74, 74', 74" . . . of conductor bundle 122 is connected to one electrode of a capacitor of a capacitor bank 124. A few of the capacitors 75, 75', 75" of capacitor bank 124 are illustrated in FIG. 6b. As illustrated therein, each capacitor is grounded, and the ground is connected to common conductor 76. Each capacitor of capacitor bank 124 periodically receives an analog voltage from a multiplexer 126 by way of a multiconductor bus 128. Multiplexer 126 in practice is an array of semiconductor transmission gates, but for simplicity may be represented as a single-pole, 36-throw mechanical switch, as suggested by switch 127 of FIG. 6b.

The capacitors of capacitor bank 124 are dimensioned in conjunction with the resistance of the electrostrictive elements with which they are associated so that the analog voltage does not decrease significantly during the interval between refreshes from multiplexer 126. Multiplexer 126 receives its input from a digital-to-analog converter (DAC) 130, which in turn receives a sequence of digital words representative of analog voltages over a conductor set 132 from a preprogrammed memory 134. The memory locations of memory 134 are addressed in sequence by an address control arrangement illustrated as a block 136, which produces a recurrent sequence of addresses which recurrently steps through all programmed memory locations. For the arrangement illustrated in FIG. 6a, address control 136 produces a recurrent sequence of 36 addresses which accesses 36 separate memory locations of memory 134, one for each pixel of display 120. Simultaneously, the addresses produced by control 136 are applied to multiplexer 126 for uniquely associating the output signal from each memory location of memory 134 with a capacitor of capacitor bank 124. Consequently, as memory 134 is addressed in sequence to produce digital words representative of analog voltages, DAC 130 converts the digital words into analog voltages, which are applied by multiplexer 126 to one of the 36 capacitors of capacitor bank 124. The various memory locations of memory 134 are preprogrammed with digital words representing voltages which, when applied to the pixels of dispaly 120, produce desired patterns of colors. With this arrangement, a predetermined pattern of colors may be produced by light reflected from the surface of display 120. As illustrated in FIG. 6a certain of the pixels are shaded and marked with a Y to indicate that they are receiving voltage selected to provide a yellow reflected color, whereas the unshaded elements receive an analog voltage selected to provide a violet reflected color. As illustrated in FIG. 6a, the displayed pattern represents the numeral 2.

As so far described, memory 134 is preprogrammed with digital words which result in a display of a single numeral. As known, memory 134 may be a RAM which is loaded on a frame-by-frame basis to produce any desired pattern of colors on display 120.

Figure 7:
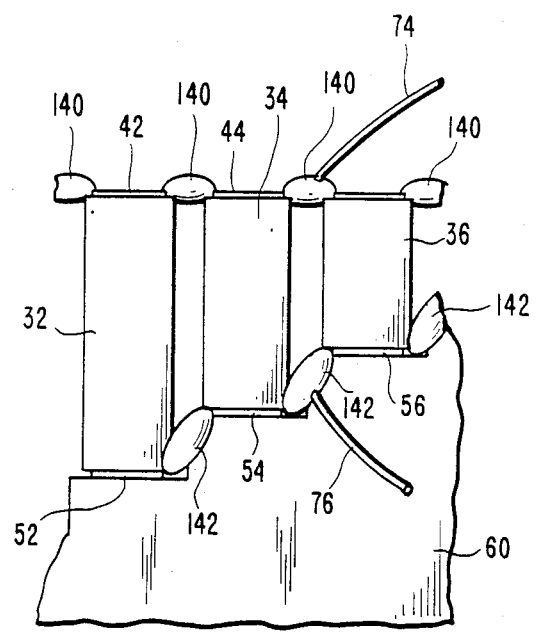
FIG. 7 an elevation view of a portion of the structure of FIG. 2 illustrating the use of elastomer for providing both support and electrical contact.

FIG. 7 illustrates in simplified elevation view a portion of the structure of FIG. 2. In FIG. 7, common connections of the top electrodes 42, 44 and 46, among each other, and to bus 74 are provided by beads 140 of electrically conductive room-temperature vulcanizing (RTV) elastomer which bridge across the gaps (if any) between the elements or between the electrodes thereof. The elastomer not only provides electrical contact but aids in retaining the electrostrictive elements in their proper position. Similarly, additional beads 142 of RTV connect the lower electrodes such as 52, 54, 56 together and to bus conductor 76. Suitable elastomers are type CV2640graphite-filled or CV1500 carbon-filled RTV, both manufactured by McGhan Nusil Company of California.

Figure 8:
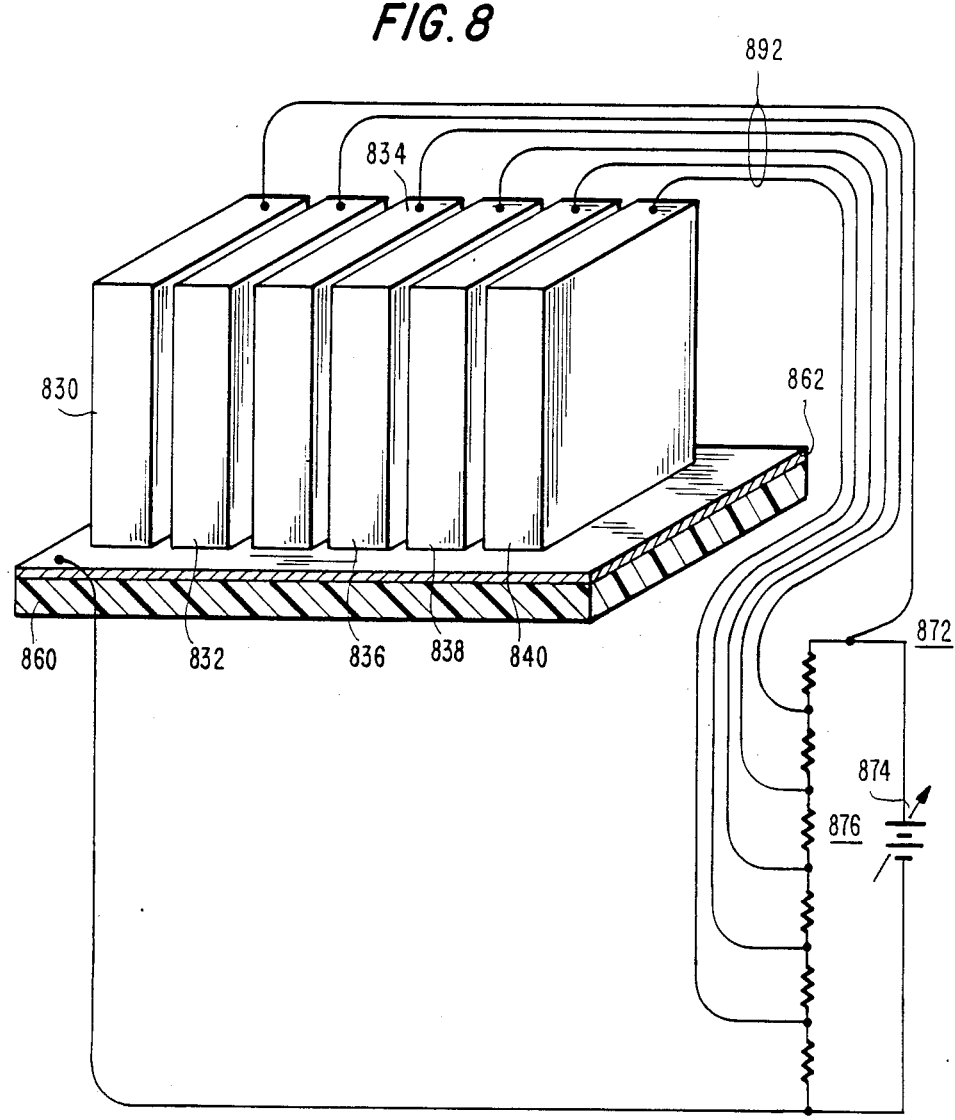
FIG. 8 illustrates an alternate embodiment of the invention in which electrostrictive elements are similarly dimensioned and the applied voltages differ from one to the next.

In FIG. 8, six electrostrictive elements 830, 832, 834, 836, 838 and 840 have the same height and are mounted upon a flat base 860. The upper surface 862 of base 860 is metallized for electrical conduction. The lower surfaces (not illustrated) of elements 830-840 are in electrical contact with metallization 862. A controllable source 872 of proportional voltages includes a controllable source of direct voltage 874 illustrated by a battery symbol which is transfixed by an arrow. A resistive voltage divider 876 is connected across source 874. The negative terminal of source 874 is connected to metallized surface 862 of base 860. A voltage appears at each node of voltage divider 876 relative to metallization 862 which is a fixed proportion of the voltage of source 874. The proportion depends, as known, upon the values of the resistors of voltage divider 876. Light-reflective electrodes (not illustrated) associated with the upper surfaces of electrostrictive elements 830–840 are individually connected to the various nodes of voltage divider 876 in such a fashion that each electrostrictive element receives a voltage which is different from that of adjacent elements. Each electrostrictive element, therefore, expands or contracts by a different amount than the adjacent elements, thereby establishing the physical separation which results in selective cancellation of particular wavelengths.

Other embodiments of the invention will be apparent to those skilled in the art. For example, electrostrictive materials other than crystalline quartz may be used, such as rochelle salts. While a source of white light has been described, any source of polychromatic light may be used, although the range of resulting reflected colors may be limited. If a source of monochromatic light is used, as for example a laser, a change in color will not occur, but the display will go from a reflective condition to a nonreflective condition when the spacing S between reflective ends is λ/4 at the monochromatic wavelength. Also, while visible light has been described, the same kind of function may be provided for invisible radiation such as infrared or ultraviolet. As described, the distance S between the reflective ends of the electrostrictive elements is equal for all the electrostrictive elements of one pixel, as for example elements 30–38 of FIG. 5, but it may be desirable to provide a slight difference in spacing to tend to cancel a broader range of wavelength related to the color being subtracted from the incident light.

What is claimed is:

1. A device for controlling the color of light reflected in response to illumination by a polychromatic source of light, comprising:

a reference reflective surface facing said source of light, said reference reflective surface having first and second dimensions, at least said first dimension being on the order of a wavelength of visible light, said reference reflective surface being oriented to reflect light from said source of light;

a first electrostrictive element including a second reflective surface having first and second dimensions, said first dimension of said second reflective surface being on the order of a wavelength of visible light, said second reflective surface being located contiguous with said reference reflective surface, said first electrostrictive element including first and second electrodes adapted for receiving electrical potential, said first and second electrodes being located and spaced on said first electrostrictive element for causing said second reflective surface to move, in response to application of potential across said first and second electrodes, in a direction having at least a component lying along a line joining said source of light with said second reflective surface; and a controllable source of potential coupled to at least said first and second electrodes of said first electrostrictive element for controllably causing striction of said first electrostrictive element for thereby controllably setting the position of said first reflective surface, said spacing of said first and second electrodes being selected in conjunction with the range of magnitude of said potential so that, at a first magnitude of said potential, said first reflective surface is at the same distance from said light source as said reference reflective surface for thereby reflecting all of said polychromatic light, and also being selected so that if said polychromatic light is white, and if said first reflective surface is caused to be displaced in the direction of said component relative to said reference reflective surface by one-quarter wavelength of red light at a second magnitude of said potential, a tendency to cause destructive interference of red light results in reflection of light of a predominantly blue-green color, if said first reflective surface is caused to be displaced in the direction of said component relative to said reference reflective surface by one-quarter wavelength of green light at a third magnitude of said potential, a tendency to cause destructive interference of green light results in reflection of a predominantly violet color, and, if said first reflective surface is caused to be displaced in said direction of said component relative to said reference reflective surface by one-quarter wavelength of blue light at a fourth magnitude of said potential, a tendency to cause destructive interference of blue light results in reflection of a predominantly yellow color.

2. A device according to claim 1 wherein said polychromatic light is white.

3. A device according to claim 1 wherein said reference reflective surface is mounted on a second electrostrictive element, said second electrostrictive element including first and second electrodes adapted for receiving electrical potential, said first and second electrodes of said second electrostrictive element being located and spaced on said second electrostrictive element for causing said reference reflective surface to move, in response to application of potential across said first and second electrodes of said second electrostrictive element, in a direction having at least a component of motion lying along a line joining said source of light and said reference reflective surface.

4. A device according to claim 3 wherein said controllable source of potential is coupled to said first and second electrodes of said second electrostrictive element for applying said potential thereacross, said relative location and spacing of said electrodes of said first and second electrostrictive elements being selected as between said first and second electrostrictive elements so that the color of light reflected is controlled in response to the magnitude of said potential.

5. A device according to claim 4 wherein the spacing between said first and second electrodes of said second electrostrictive element is less than the spacing between said first and second electrodes of said first electrostrictive element.

6. A device according to claim 1 wherein said electrostrictive element is crystalline.

7. A device according to claim 6 wherein said crystalline element is quartz.

8. A color-controllable reflective display, comprising:

a plurality of arrayed individually addressable pixels, each of said pixels comprising a plurality of electrostrictive elements, each bearing at least one reflective surface to form an array of reflectors, each of said electrostrictive elements also including first and second electrodes, said first and second electrodes of each of said electrostrictive elements being located and spaced thereon in a manner which differs as between mutually adjacent electrostrictive elements, such that application of the same electrical potential between the first and second electrodes of said mutually adjacent electrostrictive elements results in differential motion of said reflective surfaces borne thereby; and control means coupled for applying electrical potentials across said first and second electrodes of at least some of said electrostrictive elements of each of said pixels, said potentials applied across said first and second electrodes of said electrostrictive elements within any one pixel being equal, and the potentials applied across said first and second electrodes of electrostrictive elements being independently selectable from pixel to pixel for control of the color reflected thereby.

* * * * *